May 22, 1923.

H. W. WILLIAMS

DISPENSING APPARATUS FOR SEMISOLID OR PLASTIC MATERIALS

Filed June 27, 1921

1,455,980

6 Sheets-Sheet 1

Inventor
HARRY W. WILLIAMS.

Attorney

May 22, 1923.

H. W. WILLIAMS 1,455,980

DISPENSING APPARATUS FOR SEMISOLID OR PLASTIC MATERIALS

Filed June 27, 1921

6 Sheets-Sheet 3

Inventor
HARRY W. WILLIAMS.

By
Attorney

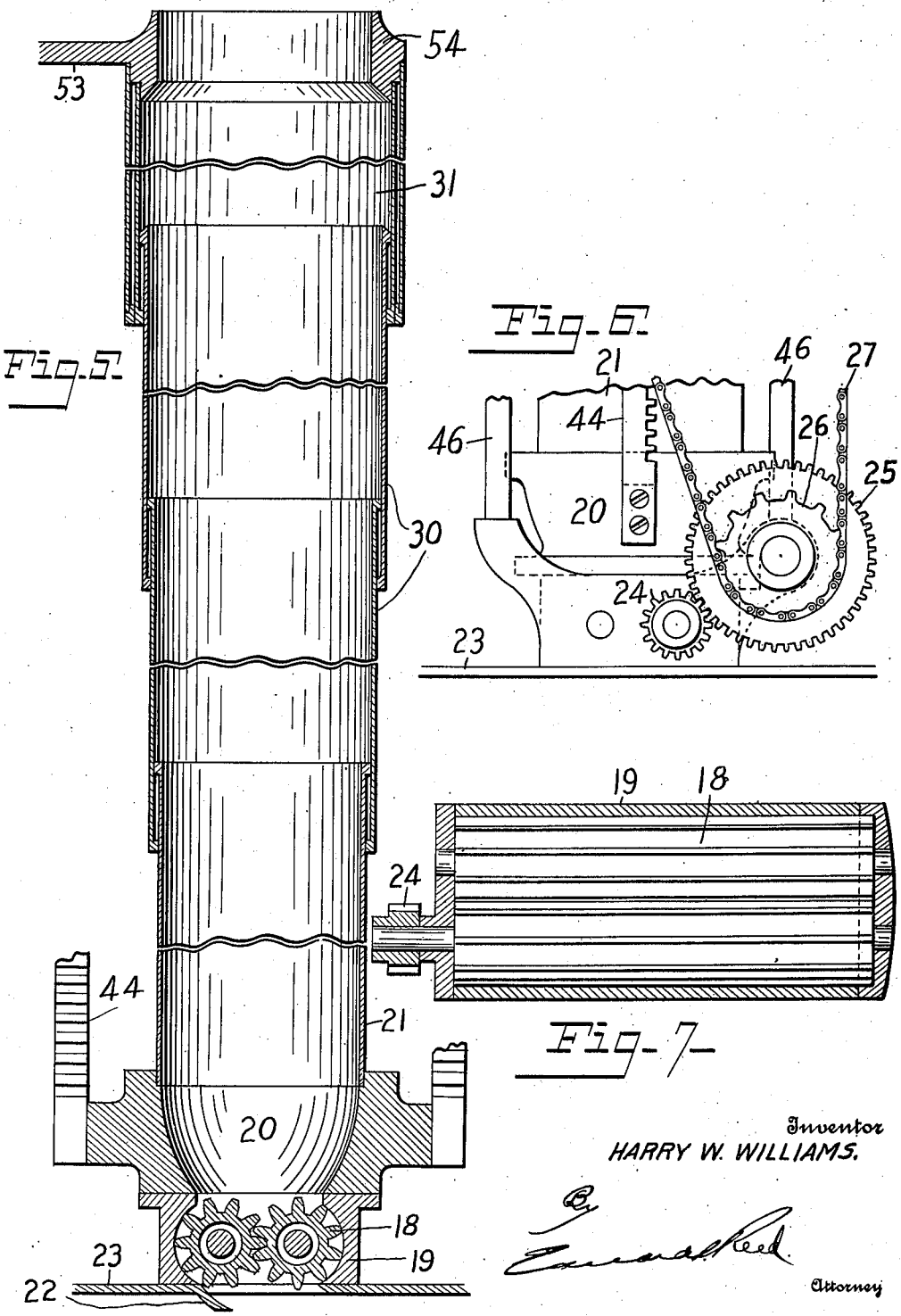

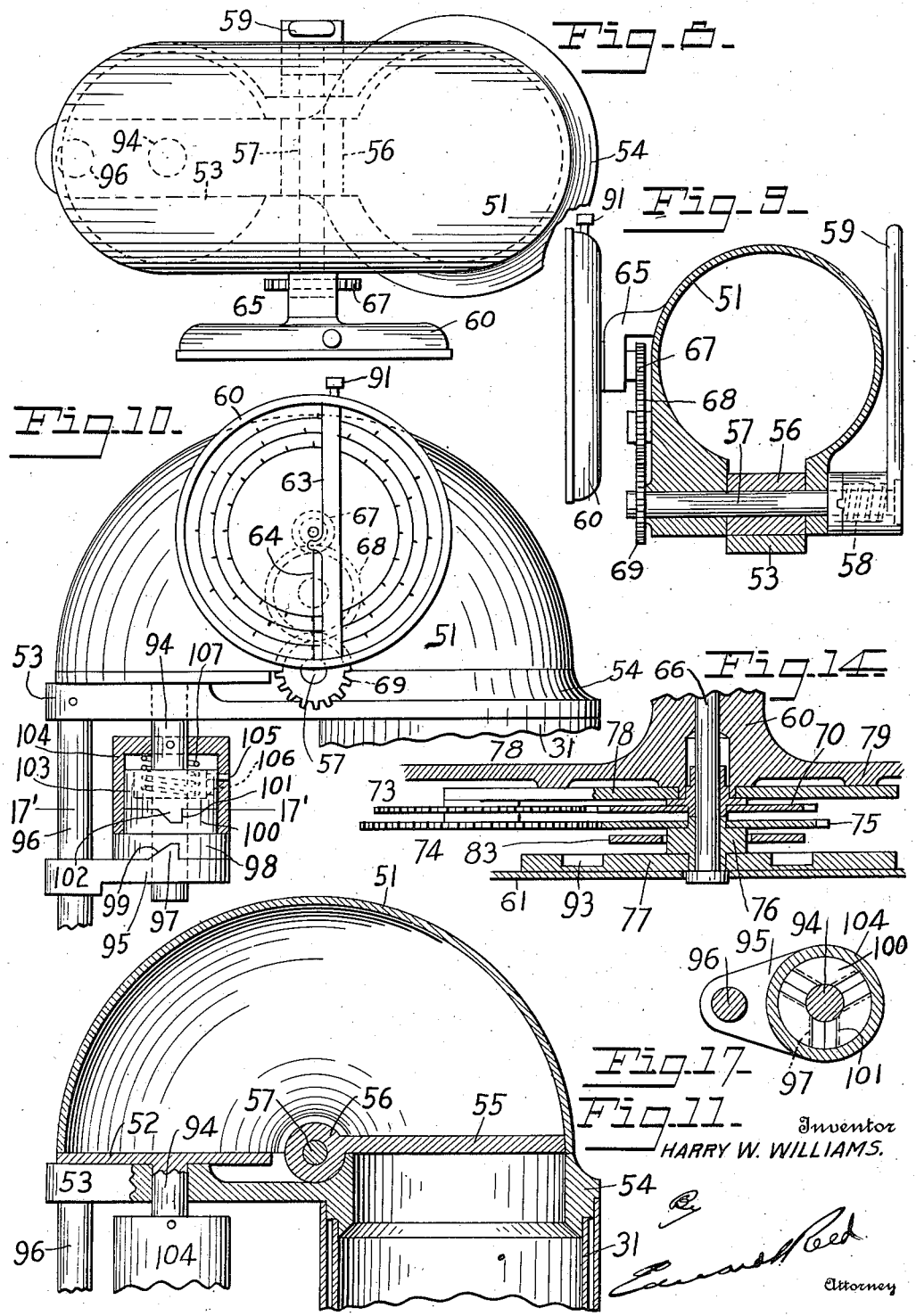

May 22, 1923.
H. W. WILLIAMS
DISPENSING APPARATUS FOR SEMISOLID OR PLASTIC MATERIALS
Filed June 27, 1921
1,455,980
6 Sheets-Sheet 6
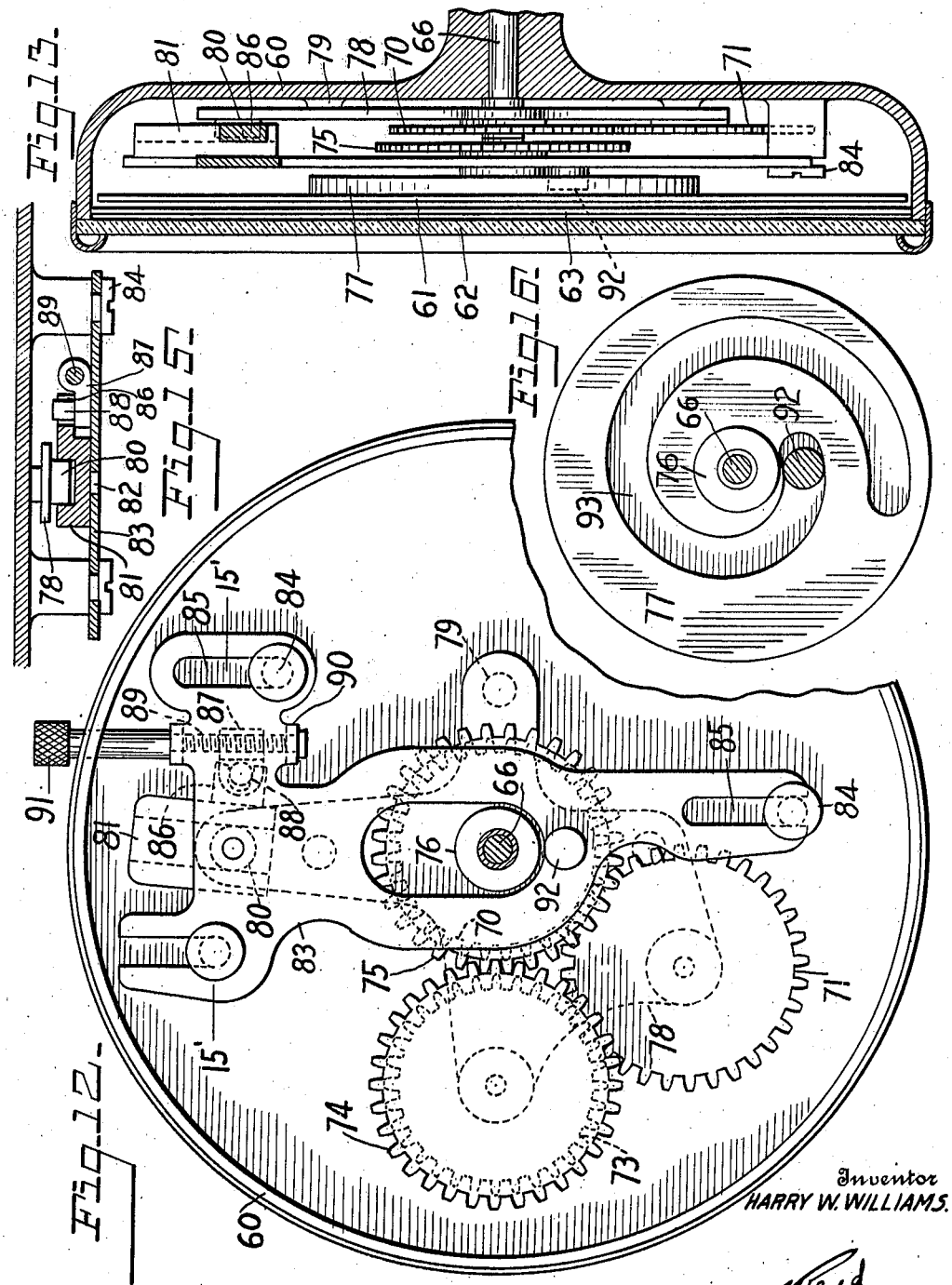
Inventor
HARRY W. WILLIAMS.
By
Attorney Patented May 22, 1923.

1,455,980

UNITED STATES PATENT OFFICE.

HARRY W. WILLIAMS, OF DAYTON, OHIO, ASSIGNOR TO CHARLES F. GARDNER, OF DAYTON, OHIO.

DISPENSING APPARATUS FOR SEMISOLID OR PLASTIC MATERIALS.

Application filed June 27, 1921. Serial No. 480,684.

*To all whom it may concern:*

Be it known that I, HARRY W. WILLIAMS, a citizen of the United States, residing at Dayton, in the county of Montgomery and State of Ohio, have invented certain new and useful Improvements in Dispensing Apparatus for Semisolid or Plastic Materials, of which the following is a specification, reference being had therein to the accompanying drawing.

This invention relates to a dispensing apparatus and while designed primarily for handling semi-solid, or plastic, materials, such as lard, grease, ice cream, or the like, it may be employed for dispensing materials of various kinds, and is in the nature of an improvement on the apparatus shown in Patent No. 1,375,947, granted to me April 26, 1921.

One object of the invention is to provide an apparatus of this kind in which the discharging device will be movable into and out of the container and will be caused to move downwardly therein as it discharges the material therefrom.

A further object of the invention is to provide an apparatus of this kind in which the discharging device may be caused to follow the contour of the wall of the container.

A further object of the invention is to provide such an apparatus with a delivery cup which will measure and deliver desired quantities of the material and which will be very simple in its construction and operation.

A further object of the invention is to provide such a delivery cup with an indicating device to indicate to the operator the amount of material which has entered the cup; and further, to so construct the indicating device that it may be adjusted to indicate in pounds and fractions thereof the weights of materials having different specific gravities.

A further object of the invention is to provide an apparatus of this kind which will be simple in its construction and operation and which may easily be maintained in operative condition.

Other objects of the invention will appear as the device is described in detail.

Figure 1:
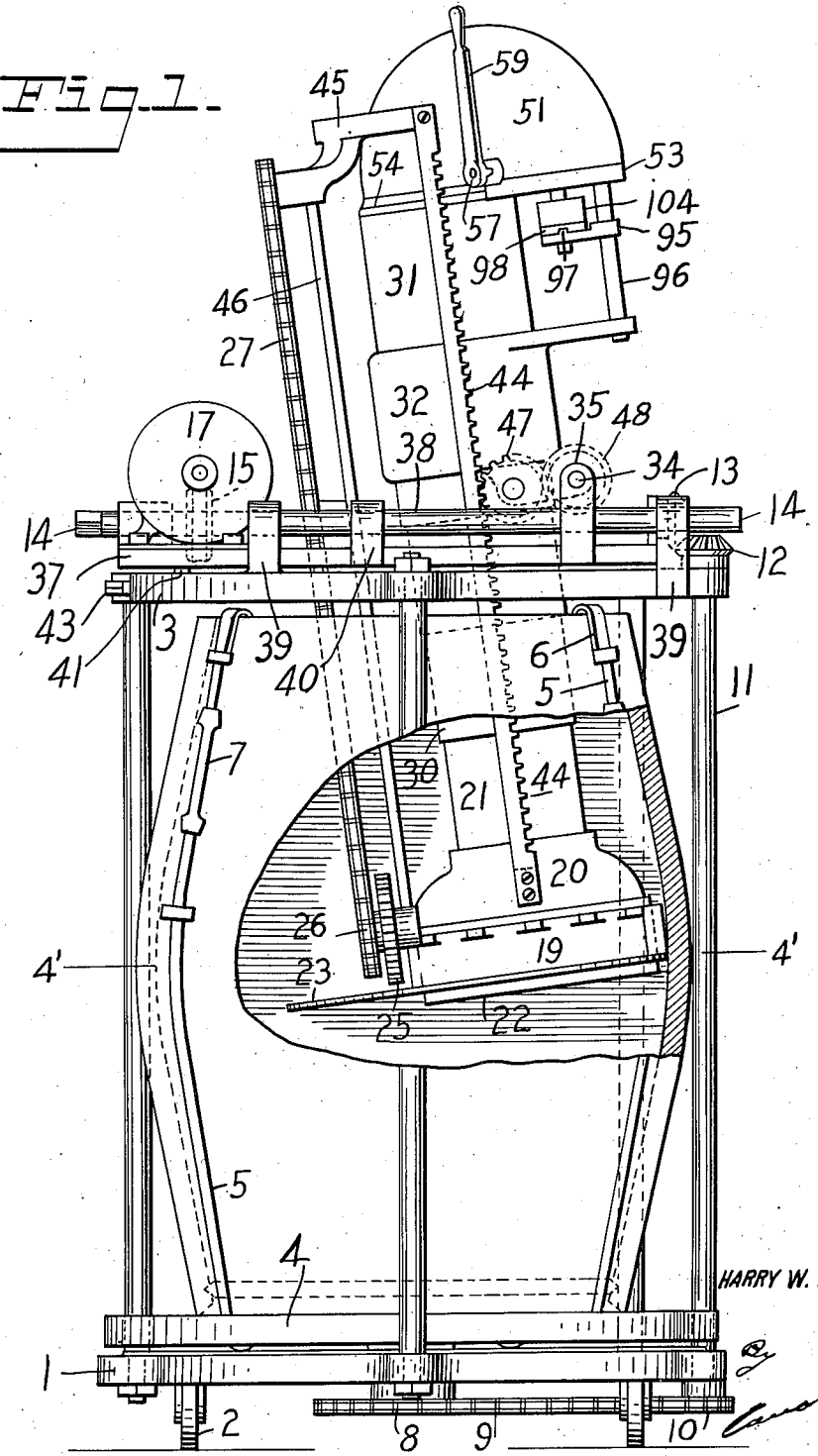
Figure 2:
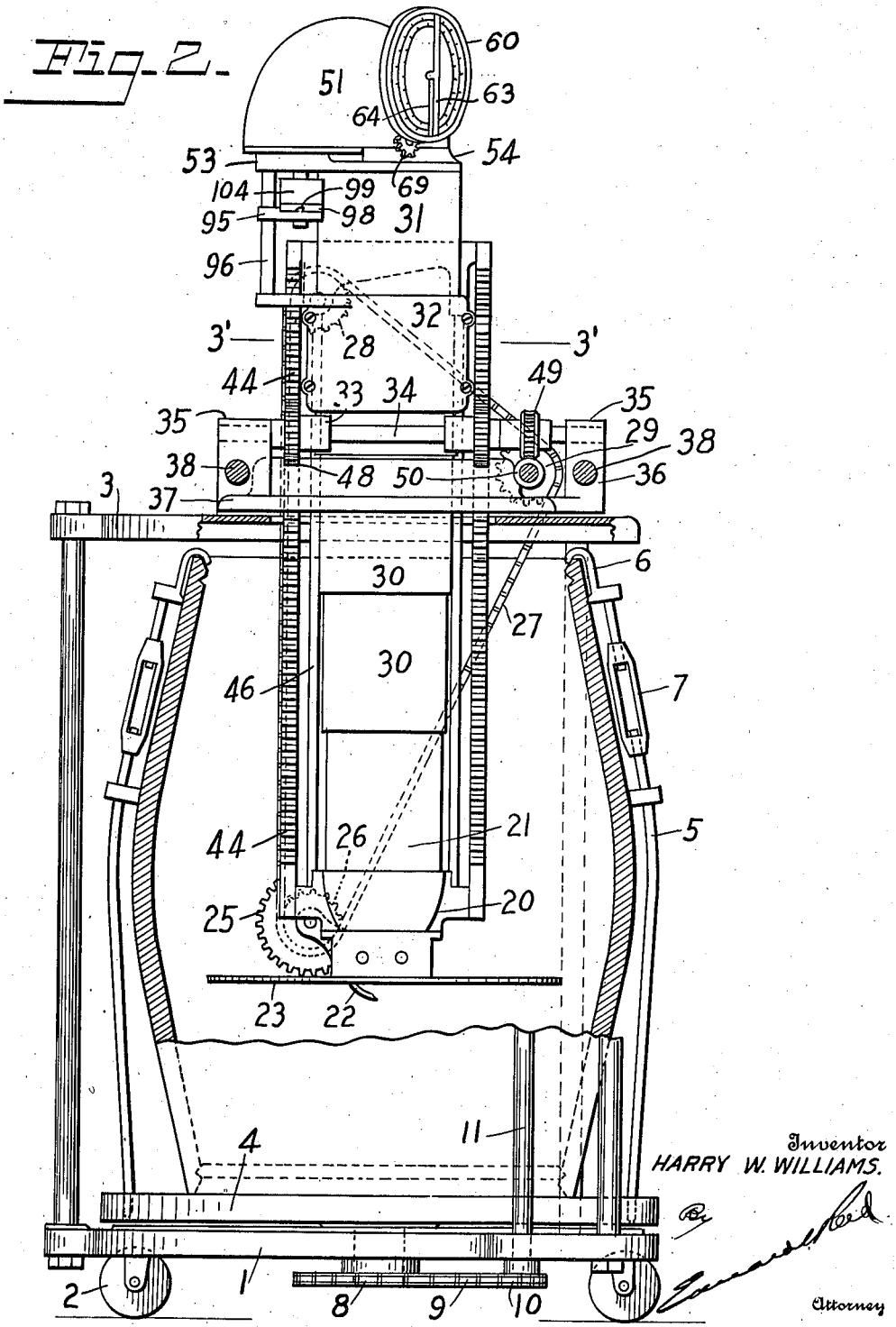
Figure 3:
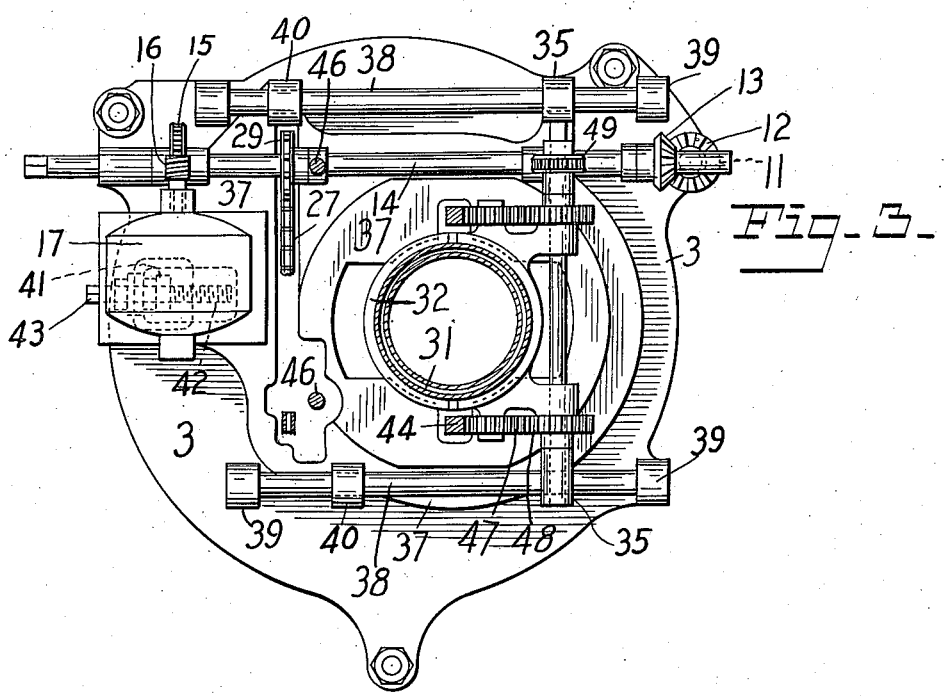
Figure 4:
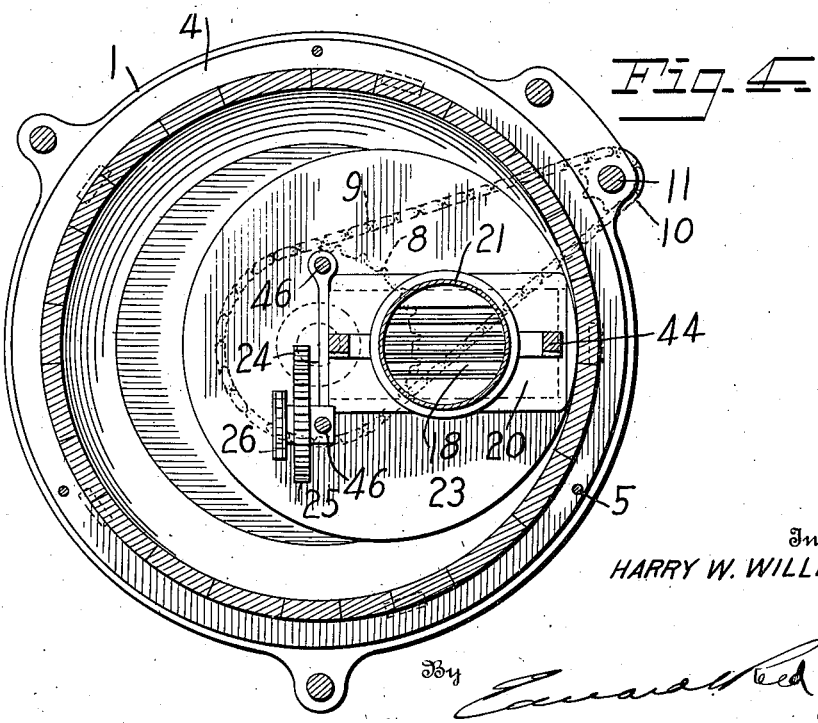

In the accompanying drawings Fig. 1 is a side elevation, partly broken away, of an apparatus embodying my invention; Fig. 2 is a front elevation, partly in section, of such an apparatus; Fig. 3 is a section taken on the line 3'—3' of Fig. 2; Fig. 4 is a section taken on the line 4'—4' of Fig. 1; Fig. 5 is a longitudinal sectional view of the discharging device and its conduit; Fig. 6 is a side elevation of the dispensing device; Fig. 7 is a sectional view taken horizontally through the two operating elements of the discharging device; Fig. 8 is a plan view of the delivery cup; Fig. 9 is a transverse vertical section taken centrally through the discharge cup; Fig. 10 is a side elevation of the discharge cup; Fig. 11 is a longitudinal vertical section taken through the discharge cup and the upper end of the conduit; Fig. 12 is a front elevation of the indicator with the dial and its supporting member removed; Fig. 13 is a vertical section taken centrally through the indicating device; Fig. 14 is a horizontal section taken centrally through a portion of the indicating device; Fig. 15 is a section taken on the line 15'—15' of Fig. 12; Fig. 16 is a detail view of the supporting device for the dial; and Fig. 17 is a section on the line 17'—17' of Fig. 10.

In these drawings I have illustrated one embodiment of the invention but it will be understood that the particular form here shown has been chosen for the purpose of illustration only and that the invention may take various forms without departing from the spirit thereof.

In the present construction I have shown the mechanism as comprising a frame consisting of a base 1, which may, if desired, be mounted on castors 2, and an upper supporting structure 3. This frame is adapted to carry the container for the material which is to be dispensed and a discharging device to take the material from the container and to deliver it at a point outside thereof. The discharging device extends into the container and one of these parts is rotatable relatively to the other so that the discharging device may be brought into contact with the different parts of the material, thus enabling the material to be removed uniformly throughout the area of the surface thereof. In the present construction the container itself is rotated and the discharging device is held against rotating movement. To this end I have mounted on the base 1 a rotatable support, or platform, 4 which is adapted to receive the container and to which the container may be attached in any suitable manner, as by means of clamping bars 5. These bars are connected at their lower ends with the support 4 and have at their upper ends hook shaped portions 6 to engage over the upper end of the container, which is here shown as a barrel, and they are provided with turn buckles 7, by means of which the barrel may be clamped onto the support. The support for the container is rotated, preferably, from the same source of power from which the other parts of the mechanism are operated and, as here shown, it has a trunnion, or shaft, extending through the base 1 and provided with a sprocket wheel 8 which is connected by a sprocket chain 9 to a sprocket 10 on the lower end of the shaft 11, which is journaled at its lower end on the base and at it supper end on the supporting structure 3, where it is provided with a beveled pinion 12 which meshes with a corresponding pinion 13 on a shaft 14. This shaft 14 is journaled in suitable bearings on the supporting structure 3 and is connected by means of a worm wheel 15 and worm 16 with an electric motor 17. The speed reduction, due to the worm and worm wheel and to the ratio of the sprockets 8 and 10, is such that the container will rotate at a relatively low speed.

The discharge device by means of which the material is removed may take various forms and, in the construction here shown, it comprises two lifting members 18 in the form of elongated gears arranged in mesh one with the other. These gears, or lifting members, are journaled in a casing 19 carried by and forming a part of the discharge head 20, with which is connected a conduit 21 leading to the exterior of the container. The casing 19 in which the gears are mounted is open at its upper and lower ends, the upper end communicating with the conduit and the opening in the lower end being arranged to permit the material in the container to come in contact with the gears. The gears are rotated in opposite directions so that the intermeshing portions thereof will move downwardly, thus causing the teeth of the gears to take up the material with which they come in contact and carry the same upwardly and discharge the same into the conduit. As here shown, a scoop, or blade, 22, extends downwardly adjacent to the gears so as to cut into the material beneath the gears and force the material upwardly into contact with the gears. This scoop may form a part of a plate 23 of relatively large diameter, which is secured to the casing 19 and is adapted to rest upon the upper surface of the material in the container. The gears, or lifting devices, are preferably driven by the motor 17 and, as here shown, one of the gears has secured thereto a pinion 24 which meshes with a gear 25 with which is rigidly connected a sprocket wheel 26. A sprocket chain 27 extends about the sprocket wheel 26, about a sprocket wheel 28, mounted near the upper end of the conduit 21, and about a third sprocket wheel 29 mounted on the shaft 14 and constituting the driving sprocket wheel. The arrangement of the sprocket wheels here shown gives the sprocket chain a triangular shape and enables the same to be maintained taut about the driving sprocket wheel 29 in all positions of the discharge device, which, as will be hereinafter explained, is vertically adjustable.

In order that the discharge device may be maintained in contact with the material in the container it is necessary that the container and the discharge device should have relative movement and, in the present instance, I have shown the discharge device as movable into and out of the container and have provided the same with means for gradually lowering it as the material is removed from the container. In order that the upper, or discharge end, of the conduit 21 which leads from the discharge device may be maintained at a fixed height in all positions of the discharge device, I have formed the conduit 21 of a plurality of telescoping sections 30 and 31, the upper section 31 being mounted in a fixed position and the lower sections 30 being adapted to be moved upwardly one within the other and into the upper fixed section, thus permitting the vertical adjustment of the discharge device without displacing the discharge end of the conduit. The fixed upper end of the conduit may be supported in various ways, and, as here shown, a band, or collar, 32 is clamped about the same and is provided with laterally extending lugs 33 which are pivotally mounted on a shaft 34 which in turn is journaled in bearings 35, forming parts of brackets 36 rigidly secured to and extending upwardly from a plate, or carriage, 37. The brackets 36 are slidably mounted on rods 38, which are mounted in lugs 39 extending upwardly from the supporting structure 3. The plate 37 is provided with other brackets, or lugs, 40 also slidably mounted on rods 38, so that the plate as a whole may be moved transversely to the supporting structure 3. By adjusting the plate 37, which carries the discharge device, transversely to the supporting structure 3, the discharge device may be so positioned that its outer edge will lie close to the side wall of the container and because of this adjustment the device can be accommodated to the containers of various diameters. Movement may be imparted to the plate in various ways but, as here shown, the plate is provided with a depending lug 41 in which is mounted a screw 42 which is journaled in a suitable bearing in the supporting structure 3 and held against longitudinal movement so that the rotation of the screw will cause the lug, or nut, 41 and consequently the plate 37, to move. In the present instance the outer end of the screw is squared, as shown at 43, to receive a socket wrench, or other suitable device, for rotating it.

When the discharge device has been laterally adjusted to accommodate it to the particular container in which it is to operate, it is moved downwardly to bring it into contact with the material in the container. This movement may be imparted to the discharge device in various ways but in the present construction I have provided on each side of the device two vertical racks 44, which are secured at their lower ends to the discharge head 20 and at their upper ends to a bracket 45 which is, in the present instance, braced against the discharge head 20 by means of rods 46. Meshing with the racks 44 are two pinions 47 which in turn mesh with other pinions 48 secured to the shaft 34. This shaft has secured thereto a worm gear 49 which meshes with a worm 50 on the shaft 14. It will be apparent, therefore, that when the motor 17 is operated the pinions 47 may be rotated and will impart downward movement to the racks and to the discharge device. Because of the reduction in speed, due to the two sets of worm gearing interposed between the pinions and the motor, this downward movement will be very slow and it is so regulated that it will be just sufficient to maintain the discharge device in contact with the material.

In the operation of the device it is desirable that the discharge device should be held in engagement with, or close to the side wall of the container. Where a cylindrical container is used this can be accomplished by merely adjusting the discharge device transversely with relation to the container but where the walls of the container taper or are curved, as in the case of a barrel, some means should be provided which will permit the discharge device to follow the contour of the wall. By pivotally mounting the discharge device, on the shaft 34, it is free to move toward and from the wall of the container. In the present instance, the axis about which the supporting device swings is arranged at one side of its center of gravity, the shaft 34 being arranged alongside of the conduit. Consequently, the discharge device will move by gravity toward the side of the container and will be held in engagement therewith during its vertical movement. Because the only resistance offered to the swinging movement of the discharge device is its own weight it will be apparent that it can be forced back toward a vertical position by contact with the lower portion of the wall of the barrel, and that the discharge device will remain in proper relation to the walls of the barrel throughout the downward movement thereof.

Means are preferably provided for measuring the material discharged from the conduit 21 of the discharge device, and this measuring device may take the form of a cup into which quantities of material are discharged from the conduit and which may then be disconnected from the conduit to permit the material to be removed therefrom. The cup as here shown at 51, has its outer wall curved and, in the present instance, semi-circular in shape. The cup is also shown as circular in cross section so that it is in effect a semi-circular tube, one end of which is closed by an end plate 52 and the other end of which is capable of being moved into and out of line with the upper end of the fixed section 31 of the conduit. As here shown, the closed end 52 of the cup is pivotally mounted on a bracket 53, carried by an annular head, or collar, 54, secured to the section 31 of the conduit. The upper end of this head 54 is so arranged with relation to the open end of the cup that the edges of the two parts will be in firm contact and form a tight joint when the cup is in line with the conduit. Arranged within the cup is a suitable piston which is here shown as a wing piston 55 and is pivotally mounted on the axis about which the outer curved wall of the cup is described and is here shown as having a hub 56 mounted on a shaft 57, which is journaled in the side walls of the cup. A spring 58 acts on the piston to move the same toward and hold the same normally at the open end of the cup. When this end of the cup is in line with the conduit and the discharge device operated, the material will be forced from the conduit into the cup and will displace the piston, forcing the same rearwardly until it comes in contact with the closed end of the cup, or the operation of the discharging device is interrupted. When the desired amount of material has been discharged into the cup it is rotated about its pivotal support to move the open end thereof out of line with the conduit and by this movement the head 54 of the conduit will sever the material in the cup from that in the conduit, leaving the cup full to its open end. The piston is then actuated by a lever 59 rigidly secured to the shaft 57 to restore the same to its normal position at the open end of the cup and thus force the material from the cup. The cup is moved away from the discharge tube in the plane of the end of that tube, in order to sever the material on a line flush with the edge of the cup but if the cup is returned to its normal position in the same plane the edge of the cup might engage the material at the end of the discharge tube and scrape off a portion of that material. To avoid this I have so mounted the cup that upon its return movement it will be elevated and then lowered into contact with the discharge tube. In the present construction this is accomplished by mounting the cup on the shaft 94 which is mounted in the bracket 53 for both rotary and axial movement and is supported at its lower end in a bracket 95 carried by a rod 96 rigidly secured to the bracket 53. The bracket 95 is provided with one or more cam projections, as shown at 97. Rigidly mounted on the shaft 94 and resting upon the bracket 95 is a disk 98 having in its lower surface one or more recesses 99 to receive the cam projection, or projections, 97. The number of recesses will depend upon the amount of movement imparted to the cup when it is moved to its open position and in the present instance I have provided three such recesses. The disk 98 is loosely mounted on the shaft 94 so that normally it will not rotate with that shaft. Arranged above and secured to the disk 98 and in the present instance forming an extension of the latter disk is a second disk 100 having formed therein a plurality of recesses 101 adapted to receive corresponding projections 102 carried by disk 103, slidably mounted on and rotatable with the shaft 94. In the present instance the disks 103 and 100 are enclosed in a cup shaped housing 104 and a pin 105 is mounted in the wall of the housing and extends into a slot 106 in the edge of the disk 103 to connect the same with the housing, which is rigidly secured to the shaft 94. A spring 107 acts on the disk 103 to press the same against the disk 100. It will be apparent, therefore, that when the cup is swung to its open position the disk 103 will be rotated but the teeth thereof will ride out of the recesses 101, thereby allowing the disks 100 and 98 to remain stationary. When the cup has been moved to its open position the teeth of the disk 103 will be brought into line with other recesses and will enter those recesses so that upon the return movement of the cup the disks 100 and 98 will rotate with the cup, thereby causing the disk 98 to ride over the cam projection 97 on the bracket 95 and thus elevate the shaft and the housing, it being noted that the housing rests upon the disk 98 and is rigidly secured to the shaft. When the cup has reached a position immediately above the discharge tube the edge of the nearest recess 99 in the disk 98 will clear the edge of the projection 97, thus permitting the cup to move downwardly into its normal, or receiving, position.

In order to indicate to the operator the amount of material that has entered the cup, a suitable indicating device is provided which is operated by the movement of the piston. This indicating device reads in pounds and fractions thereof and inasmuch as the weight is determined by the displacement of the material within the cup it will be apparent that materials having a specific gravity different from that to which the indicator has been adjusted would not be accurately measured thereby. I have, therefore, so constructed the indicator that it can be adjusted to accommodate it to materials having different specific gravities. In the present drawings the indicator comprises a casing 60 within which is mounted a dial 61 having thereon the various indications, the front of the casing being closed by a glass 62. Extending transversely to the casing between the dial and the glass is a bar 63, which on one side of the center of the dial is provided with an indicating edge 64 which indicates on the dial the weight of the material in the cup. The dial itself is preferably rotated and the indicator bar stationary and the dial may be operated from the piston in any suitable manner. As here shown, the casing is mounted on a bracket 65 extending laterally from the cup 51 and has mounted therein a shaft 66 which projects beyond the bracket and has mounted thereon a pinion 67 which is connected, through the medium of an idle gear 68, with a gear 69 on the shaft 57 which carries the piston, thus causing the movement of the piston to be transmitted to the shaft 66 of the indicator. The dial is rotatably mounted on the shaft and movement is transmitted thereto through a train of gearing as follows: A gear 70 is rigidly secured to the shaft 66 within the casing and is in mesh with a gear 71 which meshes with a gear 73. The gear 73, in turn, has rigidly secured thereto a gear 74 which meshes with a gear 75 rigidly secured to a hub 76 on which is mounted a disk 77 which supports, and in effect forms a part of, the dial 61. To adjust the device to materials having different specific gravities I shift the point of contact of the gear 74 with the gear 75 during the operation of the indicator, thus causing the gear 75 to be rotated a greater or lesser distance by a given movement of the gear 74 than it would have been rotated by that gear had the point of engagement not been shifted. To this end the gears 71, 73 and 74 are mounted upon a pivoted plate 78 which moves about the axis of the shaft 66 and is held in a position parallel with the back wall of the casing by projections, or pads, 79. This plate is provided in its upper end with a pin 80 which enters and is adapted to travel in the groove of an adjustable cam 81. This cam is here shown as pivotally mounted at 82 upon a sliding plate 83 arranged parallel with the plate 78 and guided in its movement by pins 84 extending through slots 85 formed in different parts of the plate, these slots being so arranged that the plate will move in a straight line, which in the present instance is vertical. If the slot of the cam 81 is parallel with the line of movement of the plate 83 no movement will be imparted to the plate 78 or the gears carried thereby but if the cam groove is set at an inclination to the line of movement of the plate 83 then the plate 78 will be rocked about its axis and the point of contact between the two gears shifted. To enable the cam 80 to be readily adjusted it is provided with a laterally extending lug 86 to which a nut 87 is connected by a pin and slot joint, as shown at 88. The nut 87 is mounted upon a screw 89, journaled in bearings 90 on the plate 83 and having a portion adapted to extend through the wall of the casing and provided with a head 91 by means of which it may be rotated, and the cam 81 shifted from one position to another. Vertical sliding movement is imparted to the plate 83 by means of a pin 92 rigidly secured thereto and extending into a spiral slot 93 formed in the rear face of the supporting disk 77. It will be understood that the cam 81 is adjusted to properly adjust the indicator at the beginning of the operation of the device upon a given class of material and that the adjustment will not be changed so long as the apparatus is used for that class of material.

The operation of the mechanism will be readily understood from the foregoing description and it will be apparent that when the device is to be used the discharge mechanism will be elevated to its uppermost position, the container placed upon the revolving platform 4 and rigidly secured thereto. The discharge mechanism is then moved downwardly to cause a discharge head to enter the container and the carriage 37 is moved laterally to cause the plate 23 carried by the discharge head to engage the wall of the container. The operation of the motor then causes the gears, or gear pump, 18, to lift the material and force the same upwardly through the discharge conduit from which it passes into the cup 51, forcing the piston 51 rearwardly as it enters the cup. The movement of the piston actuates the indicator and when the indicator shows the desired quantity of material to have entered the cup the operation of the motor is interrupted and the cup is swung laterally out of line with the discharge conduit and the piston is actuated to discharge material from the cup into a suitable receptacle. The cup is then swung back to its normal position in line with the discharge conduit and during this movement it will be first elevated to clear the edge of the conduit and then moved downwardly to engage with the conduit. As the gear pump is operated to remove the material the container is rotated so as to bring all parts of the surface of the material in the container into operative relation to the pump or discharge device. Consequently the material will be removed in spiral layers from the entire surface of the material. Because of the pivotal mounting of the discharge mechanism the plate 23 will be held by gravity in engagement with the wall of the container regardless of its shape and all the material in the container will be removed. When the container has been emptied the discharge mechanism is then moved to its uppermost position, the container removed and a full container substituted therefor.

While I have shown and described one embodiment of my invention I wish it to be understood that I do not desire to be limited to the details thereof as various modifications may occur to a person skilled in the art.

Having now fully described my invention what I claim as new and desire to secure by Letters Patent, is:

1. In an apparatus of the character described, a support for a container, a discharge device to remove the material from said container, one of said parts being rotatable relatively to the other, and means to cause said discharge device to move into said container as it discharges the material therefrom.

2. In an apparatus of the character described, a rotatable support for a container, a discharge device to remove material from said container, and means to cause said discharge device to move into said container as it discharges the material therefrom.

3. In an apparatus of the character described, a frame, means for supporting a container and a discharge device on said frame, one of said parts being rotatable relatively to the other, and means for causing said discharge device to gradually move toward the bottom of said container.

4. In an apparatus of the character described, a support for a container, a discharge device adapted to extend into said container, a support for said discharge device, means to rotate one of said supports relatively to the other to bring said discharge device into operative relation to different parts of the surface of the material in said container, and means to move said discharge device into said container as the material is discharged therefrom.

5. In an apparatus of the character described, a rotatable support for a container, a supporting structure, and a discharge device mounted on said structure for movement into and out of a container on said support.

6. In an apparatus of the character described, a support for a container, a supporting structure and a discharge device pivotally mounted on said structure for movement transversely to said container.

7. In an apparatus of the character described, a support for a container, a supporting structure, a carriage movably mounted on said supporting structure, a discharge device supported by said carriage, and means for adjusting said carriage relatively to said supporting structure.

8. In an apparatus of the character described, a support for a container, a supporting structure arranged above the position of said container and having guide rods mounted thereon, a carriage slidably mounted on said guide rods for movement transversely of said supporting structure, and a discharge device carried by and movable with said carriage.

9. In an apparatus of the character described, a support for a container, a supporting structure arranged above the position of said container and having guide rods mounted thereon, a carriage slidably mounted on said guide rods for movement transversely of said supporting structure, a conduit carried by said carriage, and a discharge device connected with the lower end of said conduit.

10. In an apparatus of the character described, a support for a container, a discharge device to remove material from said container, one of said parts being rotatable relatively to the other, and means for pivotally supporting said discharge device to permit it to follow the contour of the wall of said container.

11. In an apparatus of the character described, a support for a container, a discharge device to remove the material from said container, one of said parts being rotatable relatively to the other, and means to cause said discharge device to move into said container as it discharges the material therefrom, said discharge device being laterally adjustable to permit it to be properly positioned with relation to the wall of said container.

12. In an apparatus of the character described, a support for a container, a discharge device to remove the material from said container, one of said parts being rotatable relatively to the other, and means to cause said discharge device to move into said container as it discharges the material therefrom, said discharge device being mounted for free lateral movement to enable it to follow the contour of the wall of said container.

13. In an apparatus of the character described, a support for a container, a discharge device to remove the material from said container, one of said parts being rotatable relatively to the other, and means to cause said discharge device to move into said container as it discharges the material therefrom, said discharge device being pivotally mounted to permit it to follow the contour of the wall of said container.

14. In an apparatus of the character described, a support for a container, a discharge device to remove the material from said container, one of said parts being rotatable relatively to the other, and means to cause said discharge device to move into said container as it discharges the material therefrom, said discharge device being pivotally mounted on an axis at one side of its center of gravity to cause said device to move by gravity toward the side wall of said container.

15. In an apparatus of the character described, a support for a container, a discharge device to remove the material from said container, one of said parts being rotatable relatively to the other, and means to cause said discharge device to move into said container as it discharges the material therefrom, a conduit connected with said discharge device and extending beyond said container, and a pivotal support for said conduit.

16. In an apparatus of the character described, a support for a container, a discharge device to remove the material from said container, one of said parts being rotatable relatively to the other, and means to cause said discharge device to move into said container as it discharges the material therefrom, a conduit connected with said discharge device and extending beyond said container, a shaft arranged adjacent to and extending transversely to said conduit, and a pivotal connection between said conduit and said shaft.

17. In an apparatus of the character described, a rotatable support for a container, a supporting structure arranged above said container, a conduit carried by said supporting structure, a discharge device connected with the lower end of said conduit, means for causing said discharge device to move into said container as the material is discharged therefrom, and a pivotal connection betweeen said conduit and said supporting structure.

18. In an apparatus of the character described, a support for a container, a discharge device to remove the material from said container, one of said parts being rotatable relatively to the other, a conduit connected with said discharge device and extending beyond said container, a rack connected with said discharge device, a pinion meshing with said rack, and means for actuating said pinion to move said discharge device toward the material in said container.

19. In an apparatus of the character described, a support for a container, a discharge device to remove the material from said container, one of said parts being rotatable relatively to the other, a conduit comprising a plurality of telescoping sections, the outer one of which is fixed against movement and the inner one of which is connected with said discharge device, and means for moving said discharge device toward and from the fixed section of said conduit.

20. In an apparatus of the character described, a support for a container, a discharge device to remove the material from said container, one of said parts being rotatable relatively to the other, a conduit comprising a plurality of telescoping sections, the outer one of which is fixed against movement and the inner one of which is connected with said discharge device, racks connected with said discharge device and extending alongside of said conduit, a shaft extending transversely to said conduit, bearings rigidly secured to the fixed section of said conduit and mounted on said shaft, pinions carried by said shaft and connected with said racks, and means for rotating said shaft.

21. In an apparatus of the character described, a support for a container, a discharge device to remove the material from said container, one of said parts being rotatable relatively to the other, and means to cause said discharge device to move into said container as it discharges the material therefrom, said discharge device having a conduit, a delivery cup mounted for movement into and out of a position to receive material from said conduit, said cup having its outer wall curved and having one end open, a piston movably mounted in said cup and arranged normally at the open end thereof, and means to move said piston toward said open end of said cup after it has been displaced by the material entering said cup.

22. In an apparatus of the character described, a support for a container, a discharge device to remove the material from said container, one of said parts being rotatable relatively to the other, and means to cause said discharge device to move into said container as it discharges the material therefrom, said discharge device having a conduit, a delivery cup in the form of a curved tube having one end open and its other end closed, means for pivotally mounting said cup in such relation to said conduit that the open end of the cup may be moved into and out of line with the conduit, a piston pivotally mounted on an axis arranged between and substantially in the plane of the two ends of said cup, and means for actuating said piston.

23. In an apparatus of the character described, a support for a container, a discharge device to remove the material from said container, one of said parts being rotatable relatively to the other, and means to cause said discharge device to move into said container as it discharges the material therefrom, said discharge device having a conduit, a delivery cup cylindrical in cross section and substantially semi-circular in longitudinal section, said cup having one end normally open and the other end closed, means for pivotally mounting the closed end of said cup at one side of said conduit so that the open end thereof may be moved into and out of line with said conduit, a shaft extending transversely of said cup between the ends thereof and beneath the cylindrical portion thereof, a wing piston secured to said shaft and arranged to travel in said cup, a spring to hold said piston normally at the open end of said cup, and means for actuating said shaft to move said piston toward said open end of said cup after it has been displaced by the material entering the cup from the conduit.

24. In an apparatus of the character described, a support for a container, a discharge device to remove the material from said container, one of said parts being rotatable relatively to the other, and means to cause said discharge device to move into said container as it discharges the material therefrom, said discharge device having a conduit, a delivery cup mounted for movement into and out of a position to receive material from said conduit, said cup having its outer wall curved and having one end open, and a piston mounted in said cup and arranged normally at the open end thereof, and means to move said piston toward said open end of said cup after it has been displaced by the material entering said cup, an indicator mounted adjacent to said cup, and an operative connection between said indicator and said piston to cause said indicator to indicate the amount of material that has entered said cup.

25. In an apparatus of the character described, a support for a container, a discharge device to remove the material from said container, one of said parts being rotatable relatively to the other, and means to cause said discharge device to move into said container as it discharges the material therefrom, said discharge device having a conduit, a delivery cup mounted for movement into and out of a position to receive material from said conduit, said cup having its outer wall curved and having one end open, a shaft extending transversely to said cup along one side thereof, a piston mounted on said shaft and arranged within said cup, an indicator mounted adjacent to said cup and an operative connection between said indicator and said shaft, and means to actuate said shaft to cause said piston to discharge the contents of said cup therefrom.

26. In an apparatus of the character described, a support for a container, a discharge device to remove the material from said container, one of said parts being rotatable relatively to the other, and means to cause said discharge device to move into said container as it discharges the material therefrom, said discharge device having a conduit, a delivery cup mounted for movement into and out of a position to receive material from said conduit, said cup having its outer wall curved and having one end open, and a wing piston pivotally mounted in said cup and arranged normally at the open end thereof, and means to move said piston toward said open end of said cup after it has been displaced by the material entering said cup, an indicator mounted adjacent to said cup, an operative connection between said indicator and said piston to cause said indicator to indicate the amount of material that has entered said cup, and means to adjust said indicator to cause it to indicate different quantities for a given movement of said piston.

27. In an apparatus of the character described, a discharge device having a conduit leading therefrom, a cup comprising a tube curved about a transverse axis into substantially a semi-circular form and having one end open and the other end closed, means for mounting said cup adjacent to said conduit so that its open end can be moved into and out of line with said conduit, a piston arranged within said cup and pivoted on the axis about which said tube is curved, and means for actuating said piston.

28. In an apparatus of the character described, a discharge device having a conduit leading therefrom, a cup comprising a tube curved about a transverse axis into substantially a semicircular form and having one end open and the other end closed, means for mounting said cup adjacent to said conduit so that its open end can be moved into and out of line with said conduit, a piston arranged within said cup and pivoted on the axis about which said tube is curved, a spring tending to hold said piston normally at the open end of said cup, and a device operatively connected with said piston for moving the same toward said open end after it has been displaced by the material entering said cup.

29. In an apparatus of the character described, the combination with a delivery cup and a piston mounted in said delivery cup, of an indicator comprising a rotatable member, an operative connection between said rotatable member and said piston, and means for adjusting said connection to cause different amounts of movement to be imparted to said rotatable member by a given movement of said piston.

30. In an apparatus of the character described, the combination with a delivery cup and a piston mounted in said delivery cup, of an indicator comprising a rotatable member, a gear connected with said rotatable member, a second gear meshing with the first mentioned gear, an operative connection between said second gear and said piston, and means for changing the point of contact of said second gear with said first gear to cause said rotatable member to be moved different distances for a given movement of said piston.

31. In an apparatus of the character described, the combination with a delivery cup and a piston mounted in said delivery cup, of an indicator comprising a rotatable member, a gear connected with said rotatable member, a second gear meshing with the first mentioned gear, an operative connection between said second gear and said piston, a support for said second gear adjustable about the axis of the first mentioned gear, and means controlled by the rotation of said rotatable member for actuating said support to change the point of contact between the said gears.

32. In an apparatus of the character described, the combination with a delivery cup and a piston mounted in said delivery cup, of an indicator comprising a rotatable member, a gear connected with said rotatable member, a second gear meshing with the first mentioned gear, an operative connection between said second gear and said piston, a support for said second gear adjustable about the axis of the first mentioned gear, an actuating member slidably mounted adjacent to said support, a connection between said support and said actuating member, said connection being adjustable to cause said support to be moved different distances by the movement of said actuating member, and an operative connection between said actuating member and said rotatable member to cause sliding movement to be imparted to the actuating member by the rotation of said rotatable member.

33. In an apparatus of the character described, the combination with a delivery cup and a piston mounted in said delivery cup, of an indicator comprising a rotatable member, a gear connected with said rotatable member, a second gear meshing with the first mentioned gear, an operative connection between said second gear and said piston, a support for said second gear adjustable about the axis of the first mentioned gear, an actuating member slidably mounted adjacent to said support, a cam adjustably mounted on one of said parts and having a guideway arranged to be moved into and out of a line parallel with the line of movement of said actuating member, a pin carried by the other of said parts and adapted to engage said guideway, means for adjusting said cam, and an operative connection between said actuating member and said rotatable member to cause sliding movement to be imparted to the actuating member by the rotation of said rotatable member.

34. In an apparatus of the character described, a support for a container, a discharge device to remove material from said container, one of said parts being vertically movable relatively to the other, and means for pivotally supporting said discharge device to permit it to follow the contour of the wall of said container.

35. In an apparatus of the character described, a support for a container, a discharge device to remove material from said container, one of said parts being vertically movable relatively to the other, and means for movably supporting said discharge device to permit it to follow the contour of the wall of said container.

36. In an apparatus of the character described, a support for a container, a discharge device to remove material from said container, one of said parts being rotatable relatively one to the other, and means for movably supporting said discharge device to permit it to follow the contour of the wall of said container.

37. In an apparatus of the character described, a support for a container, a discharge device to remove material from said container, one of said parts being rotatable relatively to the other, one of said parts being vertically movable relatively to the other, and means for pivotally supporting said discharge device to permit it to follow the contour of the wall of said container.

38. In an apparatus of the character described, a support for a container, a discharge device to remove material from said container, one of said parts being rotatable relatively to the other and one of said parts being vertically movable relatively to the other, said discharge device being mounted for a free lateral movement to enable it to follow the contour of the wall of said container.

39. In an apparatus of the character described, a discharge device having a conduit leading therefrom, a cup comprising a tube curved about a transverse axis into substantially semi-circular form and having one end open, means for mounting said cup adjacent to said conduit so that its open end can be moved into and out of line with said conduit, a piston mounted within said cup, and means for actuating said piston.

40. In an apparatus of the character described, a discharge device having a conduit leading therefrom, a cup comprising a tube curved about a transverse axis into substantially semi-circular form and having one end open, means for mounting said cup adjacent to said conduit so that its open end can be moved into and out of line with said conduit, a piston mounted within said cup, means for actuating said piston, and means acting on said piston to move the same toward the open end of said cup after it has been displaced by material entering the cup.

41. In an apparatus of the character described, a discharge device having a conduit leading therefrom, a cup comprising a tube curved about a transverse axis into substantially a semi-circular form and having one end open, a pivotal support for said cup to permit the open end thereof to be moved into and out of line with said conduit, a piston mounted in said cup, means for actuating said piston to discharge material from said cup, and means for imparting vertical movement to said cup as it is returned to its position in line with said conduit.

42. In an apparatus of the character described, a discharge device having a conduit leading therefrom, a cup comprising a tube curved about a transverse axis into substantially a semi-circular form and having one end open, a pivotal support for said cup to permit the open end thereof to be moved into and out of line with said conduit, a piston mounted in said cup, means for actuating said piston to discharge material from said cup, the pivotal support for said cup mounted for both rotary and axial movement, a cam fixed with relation to said shaft, a part cooperating with said cam, and means for connecting said parts with said shaft on the return movement only of said cup.

43. In an apparatus of the character described, a discharge device having a conduit leading therefrom, a cup comprising a tube curved about a transverse axis into substantially a semi-circular form and having one end open, a shaft to pivotally support said cup to permit the open end thereof to be moved into and out of line with said conduit, a piston mounted in said cup, means for actuating said piston to discharge material from said cup, said shaft being mounted for both rotary and axial movement, a cam fixed with relation to said shaft, a disk rotatably mounted on said shaft and having a recess to receive said cam, a toothed member connected with said disk, a pawl and ratchet connection betwen said toothed member and said shaft to cause said toothed member to rotate with said shaft on the return movement only of said cup.

44. In an apparatus of the character described, a discharge device having a conduit leading therefrom, a cup comprising a tube curved about a transverse axis into substantially a semi-circular form and having one end open, a shaft to pivotally support said cup to permit the open end thereof to be moved into and out of line with said conduit, a piston mounted in said cup, means for actuating said piston to discharge material from said cup, said shaft being mounted for both rotary and axial movement, a cam fixed with relation to said shaft, a disk rotatably mounted on said shaft and having a recess to receive said cam, a toothed member connected with said disk, a pawl and ratchet connection between said toothed member and said shaft to cause said toothed member to rotate with said shaft on the return movement only of said cup, a housing rigidly connected with said shaft and engaging the disk which cooperates with said cam whereby vertical movement will be imparted to said shaft and said cup as the latter is returned to its normal position.

45. In an apparatus of the character described, a discharge device having a conduit leading therefrom, a cup adapted to be moved into and out of a position to receive material from said conduit, a shaft to pivotally support said cup and mounted for both rotary and axial movement, a disk rigidly supported adjacent to said shaft and having a cam projection, a second disk rotatably mounted on said shaft adjacent to the first mentioned disk and having a recess to receive said cam projection, a disk loosely mounted on said shaft, means for connecting the last mentioned disk with said recessed disk when said shaft is rotated in one direction only, a housing enclosing said last mentioned disk, engaging said recessed disk, and rigidly secured to said shaft, and a pin and slot connection between said housing and the last mentioned disk.

In testimony whereof, I affix my signature hereto.

HARRY W. WILLIAMS.